(12) United States Patent
Goldberg

(10) Patent No.: US 7,283,937 B2
(45) Date of Patent: Oct. 16, 2007

(54) METHOD, APPARATUS, AND PROGRAM PRODUCT FOR DISTINGUISHING VALID DATA FROM NOISE DATA IN A DATA SET

(75) Inventor: David Goldberg, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 11/314,986

(22) Filed: Dec. 21, 2005

(65) Prior Publication Data
US 2007/0143081 A1 Jun. 21, 2007

(51) Int. Cl.
*G01N 23/00* (2006.01)

(52) U.S. Cl. .................. 702/189; 702/69; 702/191; 250/288; 250/281; 250/282; 250/290

(58) Field of Classification Search ........... 702/189, 702/191, 69; 375/152, 343; 711/112, 117, 711/158, 167; 714/755, 766; 250/288, 290, 250/281, 282; 436/86, 173
See application file for complete search history.

(56) References Cited

U.S. PATENT DOCUMENTS

| | | | |
|---|---|---|---|
| 4,796,260 A | * | 1/1989 | Schilling et al. ............. 714/755 |
| 5,274,508 A | * | 12/1993 | Tan et al. ...................... 360/48 |
| 5,440,686 A | * | 8/1995 | Dahman et al. ............ 345/537 |
| 5,764,691 A | * | 6/1998 | Hennedy et al. ............ 375/152 |

* cited by examiner

*Primary Examiner*—Michael P. Nghiem
*Assistant Examiner*—Hien Vo
(74) *Attorney, Agent, or Firm*—Park, Vaughan & Fleming LLP

(57) ABSTRACT

A system is provided for processing data values in a data set to create a data value representation having a signal side. The data set contains valid data values and noise data values where the number of the valid data values is statistically insignificant with respect to the number of noise data values. The system determines a statistically significant portion of the signal side and fits a curve to the statistically significant portion which extends beyond the statistically significant portion of the signal side. Once the curve is determined, the system can determine a data-validity confidence value for one of the data values responsive to the curve. The data-validity confidence value can be used determine that a data value in a set of spectral data is not a noise data value.

30 Claims, 8 Drawing Sheets

METHOD, APPARATUS, AND PROGRAM PRODUCT FOR DISTINGUISHING VALID DATA FROM NOISE DATA IN A DATA SET

STATEMENT REGARDING FEDERALLY SPONSORED RESEARCH OR DEVELOPMENT

This invention was made with government support under (1RO1 GM074128-01) awarded by The National Institute of Health. The government has certain rights in the invention.

CROSS-REFERENCE TO RELATED APPLICATIONS (Not applicable)

INCORPORATION-BY-REFERENCE OF MATERIAL SUBMITTED ON A COMPACT DISC (Not applicable)

BACKGROUND

1. Technical Field

The disclosed technology relates to the fields of bioinformatics and computational detection of valid data values from noise data values in a data set.

2. Background Art

There exists many situations where a data set contains a mixture of valid data values and noise data values. It is often difficult to distinguish between the valid data values and the noise data values within the data set. In addition, there are data sets where the computational cost of analyzing the data set is extremely dependent on whether a noise data value is mistakenly identified as a valid data value. Often the computational cost of analyzing the data set is only marginally dependent on whether a valid data value is mistakenly identified as a noise data value. Another issue with identifying a noise data value as a valid data value is that subsequent analysis of the data set is likely to generate a wrong answer, whereas failure to identify a valid peak may create ambiguity, but will not provide incorrect results.

One example of such a data set is spectral data produced from Fourier-transform mass spectrometers. Fourier-transform mass spectrometers (FTMS) are the most accurate class of contemporaneous mass spectrometers. FTMS uses the ion cyclotron resonance principle to determine the m/z (mass-charge ratio) of sample molecules. Ions are stored inside an analyzer cell situated within a homogenous magnetic field such that the ions move in orbits having a radius corresponding to their cyclotron frequencies. FTMS uses a resonance method to detect the image current signal generated by the ions in the cell. The orbits of the ions can be manipulated by adding energy to the ions (such as by applying an RF frequency burst (a chirp) to the cell containing the ions and thus, increasing the velocity of the ions). Furthermore, the cell is designed such that when ions pass close by an electrode, the moving ions induce a charge on the electrode. This induced charge generates a sinusoidal image current that can be measured and that decays as the ions return to their original orbits. A Fourier Transformation applied to the image current generates an amplitude/frequency representation of the image current. This amplitude/frequency representation can be transformed to a m/z spectrum that is similar to the spectrum produced by other classes of tandem mass spectrometers. One skilled in the art will understand that if the measured ion is singly charged, the m/z of a spectral peak represents the mass of the ion represented by that spectral peak.

FTMS spectra have two characteristic that are different from the spectra produced by other classes of mass spectrometers. One of these characteristics is that the spectra resolution is greater than that of the other classes of mass spectrometers. Another characteristic is that FTMS spectra have a carpet of noise data values throughout the data set comprising the spectra. This carpet of noise data values in the spectra makes it difficult to reliably distinguish valid data values resulting from low-abundance compounds in the analyzer cell from the noise data values.

The technology disclosed herein can be applied to data sets other than spectral data so long as the data set includes sufficiently more noise data values than valid data values.

It would be advantageous to provide a reliable method of distinguishing valid data values from noise data values in a data set where the computational cost of the analysis of the data set is dependent on whether a noise data value is incorrectly identified as a valid data value. It would also be advantageous to be able to accurately distinguish noise data values from valid data values so that analysis of the data set is will not provide incorrect results.

In the context of FTMS spectra, it would be advantageous to provide a reliable method of distinguishing valid data values representing signal peaks resulting from small numbers of ions in the measured sample from the noise data values that are characteristic of spectra generated by a Fourier-transform mass spectrometer.

DETAILED DESCRIPTION

One aspect of the disclosed technology automatically and efficiently processes a data set that includes noise data values and valid data values where the number of the valid data values that could be identified as noise is statistically insignificant with respect to the number of noise data values. One embodiment of this technology generates a data value representation of the data values in the data set. The data value representation has a signal side that includes a statistically significant portion that is used to define a curve that extends beyond the statistically significant portion. A data-validity confidence value can then be determined for each data value in the data set responsive to the curve.

Figure 1:
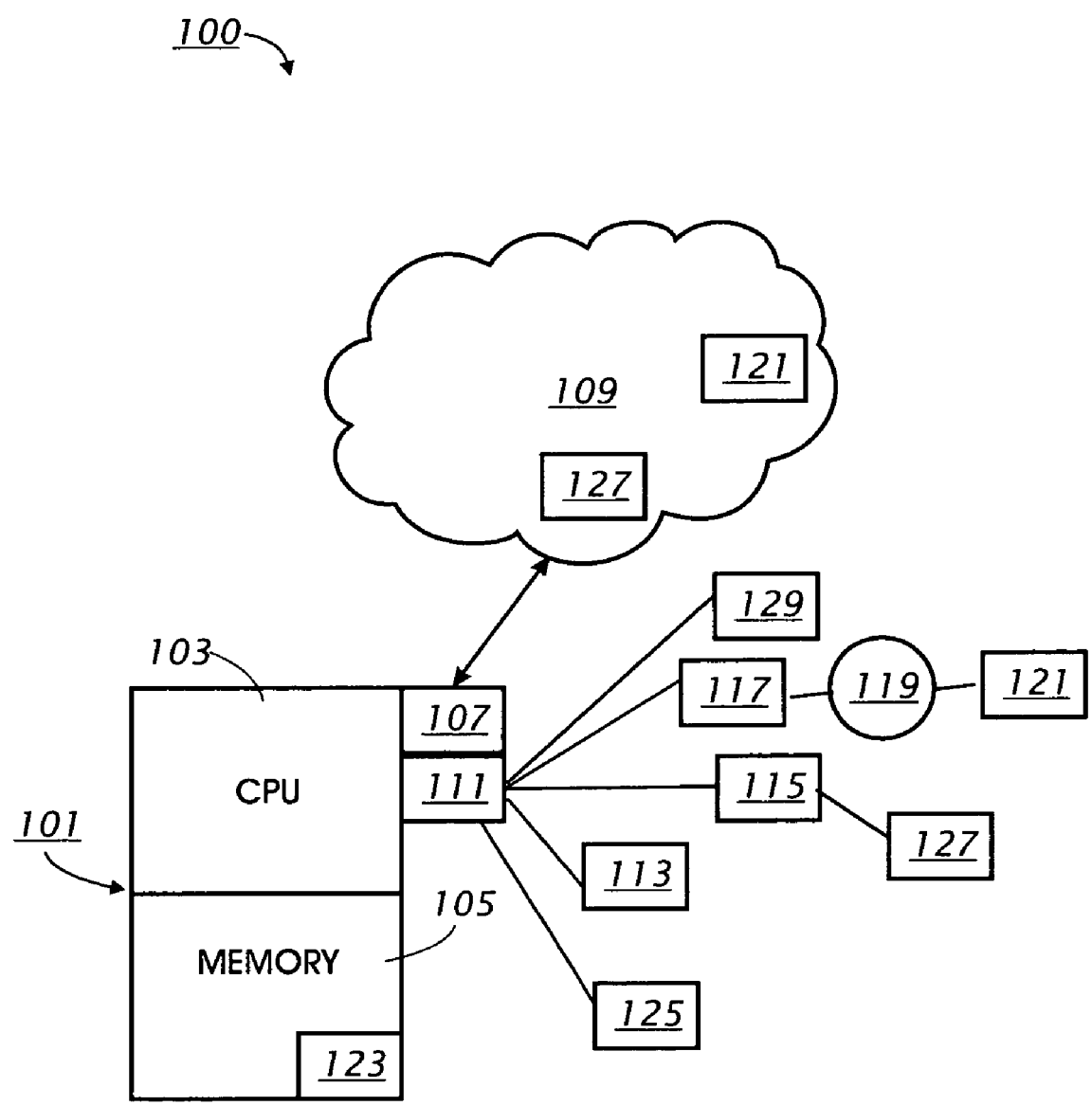
FIG. 1 illustrates a networked computer system in accordance with a preferred embodiment.

FIG. 1 illustrates a networked computer system 100 that can incorporate theh disclosed technology. The networked computer system 100 includes a computer 101 that includes a CPU 103, a memory 105 and can include a network interface 107. The network interface 107 provides the computer 101 with access to a network 109. The computer 101 also includes an I/O interface 111 that can be connected to a user interface device(s) 113, a storage system 115, and a removable data device 117 by using one or more direct connections and/or data buses. The removable data device 117 can read a computer-usable data carrier 119 (for example, but without limitation, a memory stick, CD, floppy, DVD or any other tangible media) that typically contains a program product 121 or data for analysis. The user interface device(s) 113 can include a display device 125. The storage system 115 (along with the removable data device 117), the computer-usable data carrier 119, and (in some cases the network 109) comprise a file storage mechanism. The program product 121 on the computer-usable data carrier 119 is generally read into the memory 105 as a program 123 which instructs the CPU 103 to perform specified operations. In addition, the program product 121 can be provided from devices accessed using the network 109. One skilled in the art will understand that the network transmits information (such as data that defines a computer program). Generally, the information is embodied within a carrier-wave. The term "carrier-wave" includes electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 109. Thus, the network 109, like a tangible physical media, is a computer-usable data carrier. Spectral data 127 or other data set can reside on the storage system 115, the network 109, or on the computer-usable data carrier 119. A mass spectrometer 129 can be interfaced directly to the I/O interface 111 to provide the spectral data 127. In addition, the spectral data 127 can be provided through the network 109. One skilled in the art will understand that not all of the displayed features of the computer 101 need to be present for all embodiments that implement the techniques disclosed herein (in particular, the computer need not be connected to the network 109).

One aspect of the disclosed technology is that, given a data set that represents spectral data from a Fourier-transform mass spectrometer where the valid data values represent valid spectral peaks and the noise data values represent noise peaks, the disclosed technology can distinguish noise data values from low-intensity valid data values. It does this by processing the spectral peaks in the spectral data to create a data value representation, generating a curve responsive to the data value representation and then comparing any given data peak to the curve to provide a data-validity confidence value that can be used to determine whether a particular spectral peak is a noise peak.

One aspect of the disclosed technology is that its accuracy increases as the number of noise data values increases with respect to valid data values in the data set. That is, the accuracy of the technology is a function of how much the valid data values in the data set perturb the distribution of the noise data values. The number of valid data values can be reduced by filtering out the obviously valid data values when generating the data value representation and thus reduce this perturbation.

Some embodiments of the disclosed technology use a single curve for the entire data set. Other embodiments partition the data set and generate a separate curve for each partition. Still other embodiments will generate overlapping curves or use overlapping partitions. In such embodiments, the data value is compared to the curve relevant to that data value (such as selecting the partition most closely associated with the data value to determine. the curve).

The curve is generated by generating the data value representation for the data values in the relevant partition of the data set (or the entire data set). In some embodiments, this data value representation results in a histogram of the number of data values having a range of values. Once the data value representation is completed, a statistically significant portion of the signal side of the data value representation is used to fit a curve that extends beyond the statistically significant portion of the data value representation. A data-validity confidence value can then be determined for any given data value by comparing the data value to the curve relevant to that data value.

One embodiment of the disclosed technology is that of distinguishing noise peaks from valid low-intensity spectral peaks from a fragmentation spectrum produced by a Fourier-transform mass spectrometer. In this embodiment, the curve is generated by binning the data peaks in the relevant portion of spectral data by at least the peak intensity of the data peaks and results in a histogram of the count of data peaks binned according to peak intensity. Once the data value representation is completed, a statistically significant portion of the signal side of the histogram (having well populated bins) is used to fit a curve that extends beyond the statistically significant portion of the signal side of the histogram. Then, the intensity of any data peak can be compared to the curve to determine whether the data peak is a noise peak. An example of spectral data produced by a Fourier-transform mass spectrometer is illustrated by FIG. 2.

Figure 2:
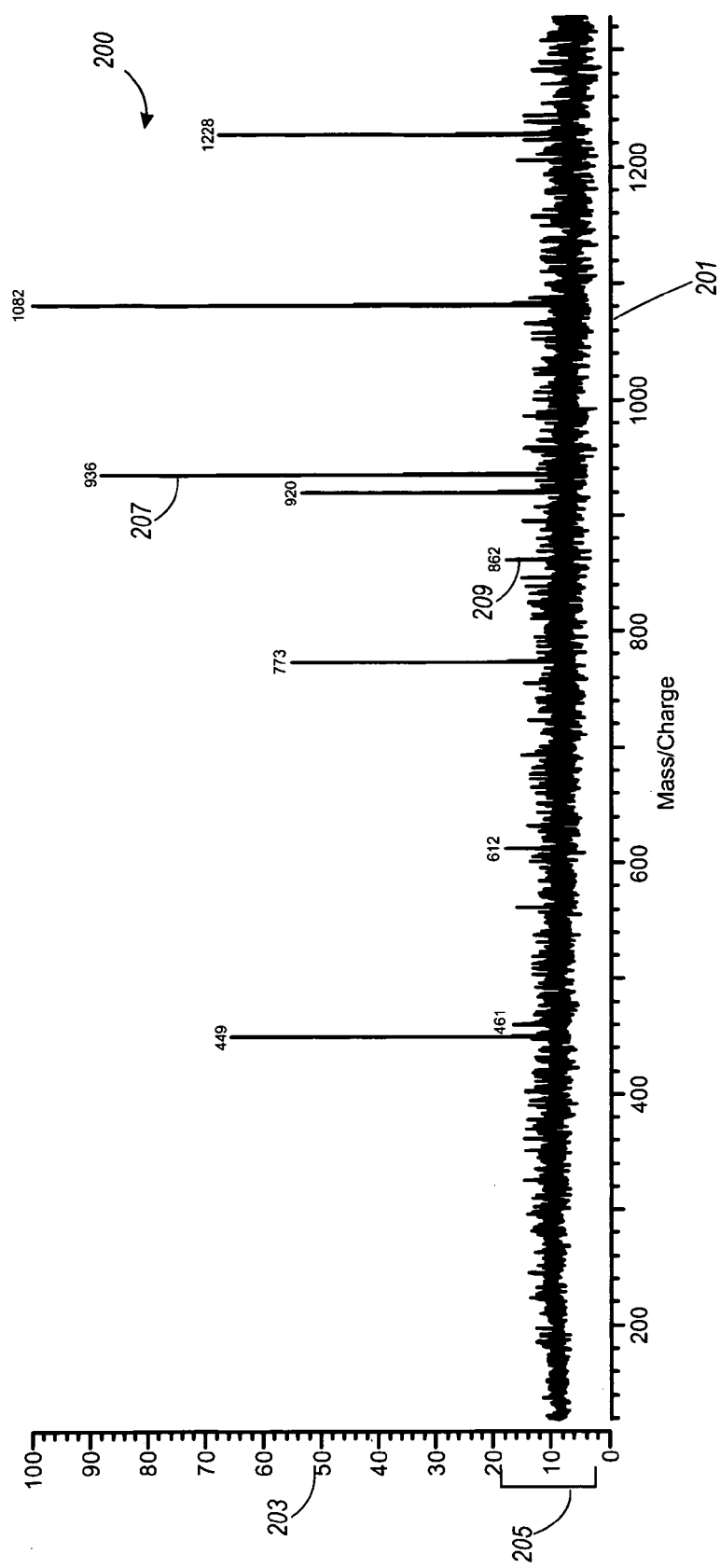
FIG. 2 illustrates a fragmentation spectrum from a Fourier-transform mass spectrometer.

FIG. 2 illustrates a Fourier-transform mass spectrometer fragmentation spectrum 200 (as the data set) containing spectral peaks (data values) having a m/z axis 201 that extends horizontally and that (for valid data values) indicates the measured m/z of the ionized molecules within the sample processed by the Fourier-transform mass spectrometer. A peak intensity axis 203 indicates the amount of ionized molecules that were detected in the sample that contribute to a particular spectral peak. The Fourier-transform mass spectrometer fragmentation spectrum 200 has a noise band 205 made up of many low-intensity spectral peaks. While an obvious spectral peak 207 can be easily distinguished from the noise band 205 it is difficult to distinguish between a noise peak and a low-intensity spectral peak 209. Thus, the noise peak can easily be mistaken for a valid spectral peak. When determining glycan topology, an incorrectly identified spectral peak (such as designating a noise peak as a valid spectral peak) may result in an incorrect determination of the glycan's topology. One aspect of the disclosed technology is that the overwhelming number of noise peaks to signal peaks allows the noise peaks themselves to be used to help distinguish noise peaks from signal peaks.

Figure 3:
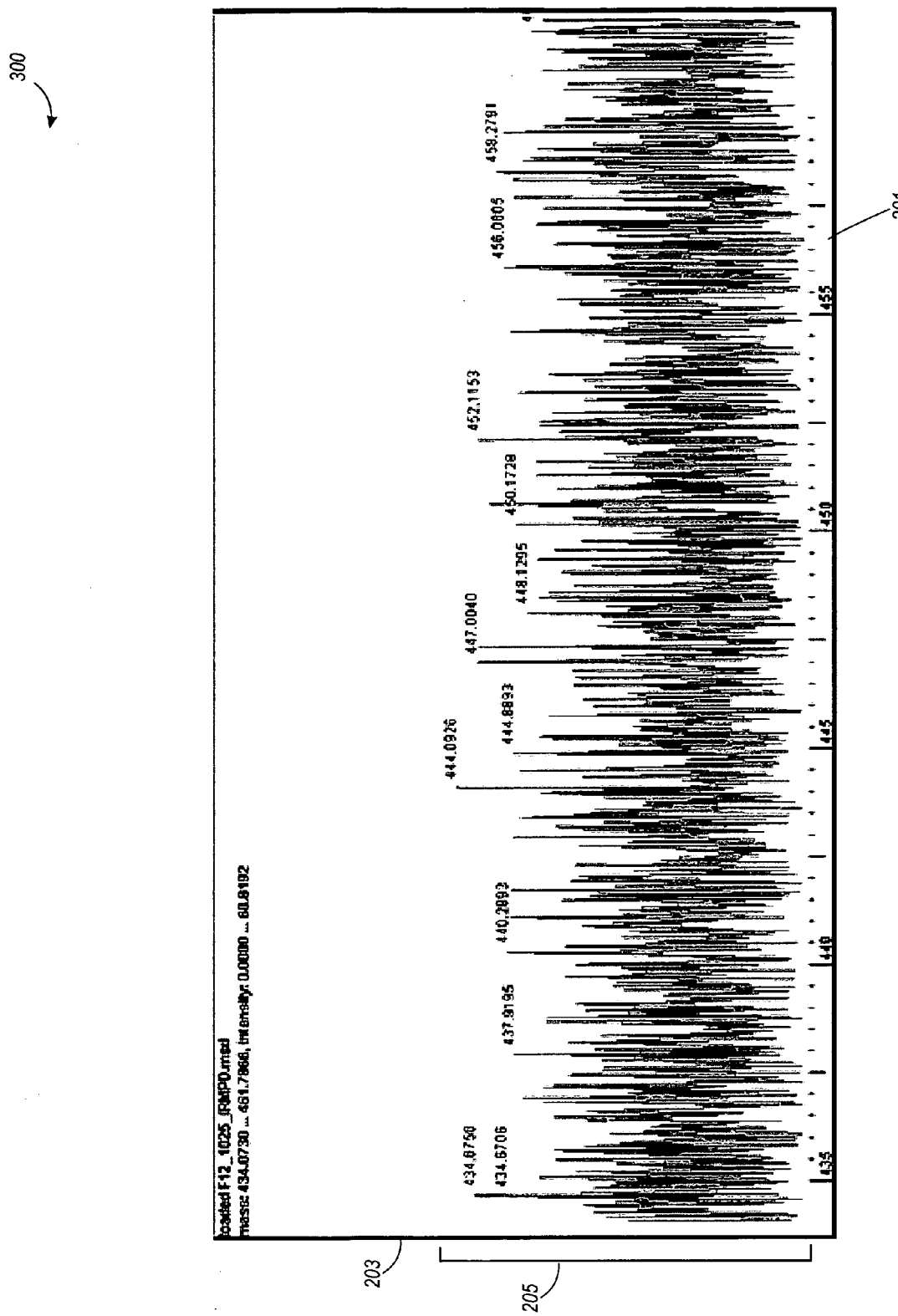
FIG. 3 illustrates a magnified portion of the fragmentation spectrum shown in FIG. 2.

FIG. 3 illustrates a fragmentation spectrum section 300 that has been magnified from a portion of the Fourier-transform mass spectrometer fragmentation spectrum 200 and illustrates a data set that has been extremely large number of noise peaks (noise data values) in the noise band 205.

While much of the following description is directed to explaining how the disclosed technology can be applied to spectral data obtained from a Fourier-transform mass spectrometer, one skilled in the art will understand that the disclosed technology is not limited to such an embodiment and that the disclosed technology can be used with any appropriate data set having an overwhelming number of noise data values compared to the number of valid data values. In particular, the disclosed technology can be applied to any data set, or data that can be transformed into a data set having characteristics where the noise data values vastly out number the valid data values. The disclosed technology also allows obviously valid data values to be initially removed from the data set leaving only noise data values and comparatively rare valid data values. Note that the Fourier-transform mass spectrometer fragmentation spectrum 200 has these characteristics.

Figure 4:
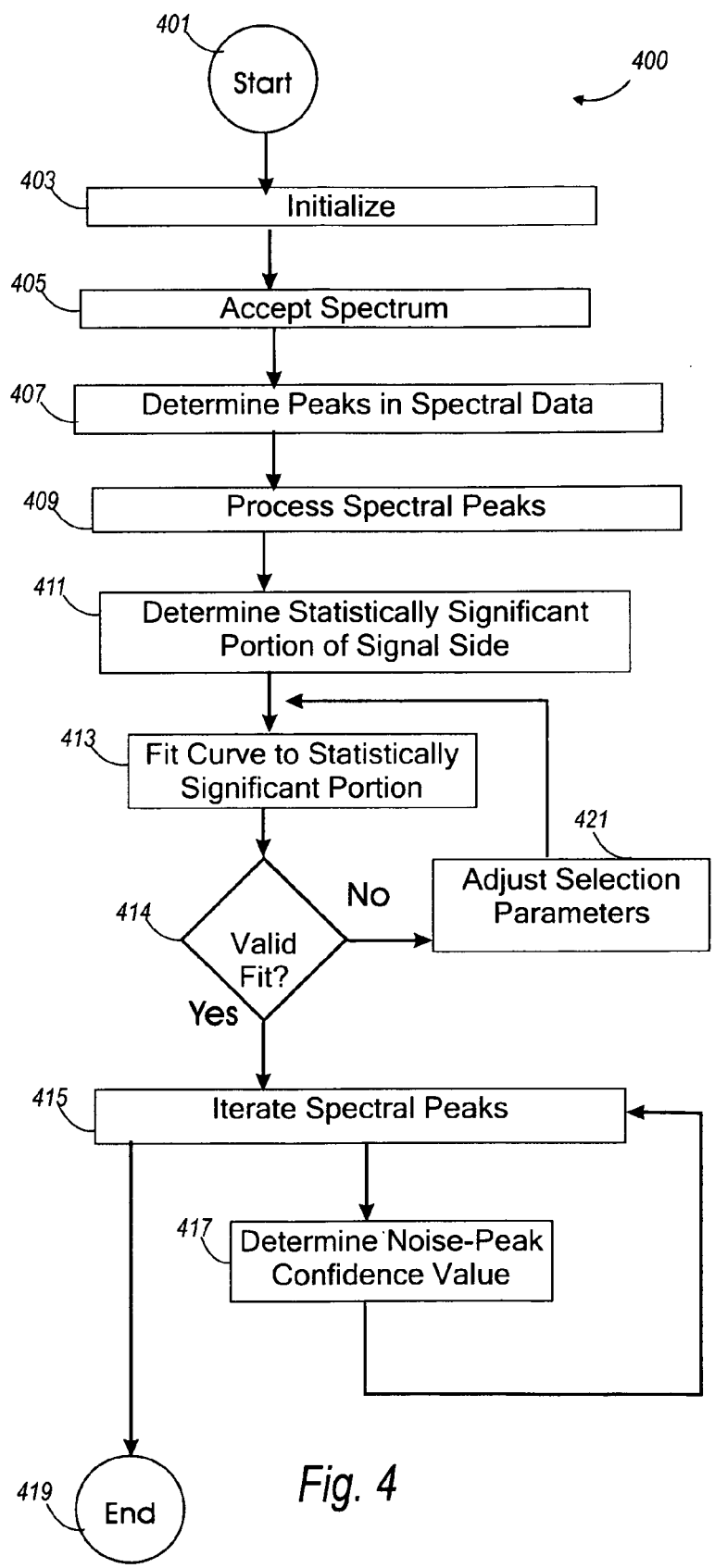
FIG. 4 illustrates one embodiment of a process for determining a data-validity confidence value to distinguish valid data values from noise data values of a spectrum that has a noise band.

FIG. 4 illustrates a data-validity confidence value determination process 400 that initiates at a 'start' terminal 401 and continues to an 'initialization' procedure 403 that performs any needed initialization. Once initialized, an 'accept spectral data' procedure 405 receives a data set (such as spectral data as illustrated in FIG. 2). For this illustration, the data set can be obtained directly from a Fourier-transform mass spectrometer using, for example, a data bus, or indirectly by accessing the spectral data from a computer-usable data carrier such as the network 109, the removable data device 117, the storage system 115, etc. One skilled in the art will understand that other types of data sets can be accepted in analogous ways.

Figure 7:
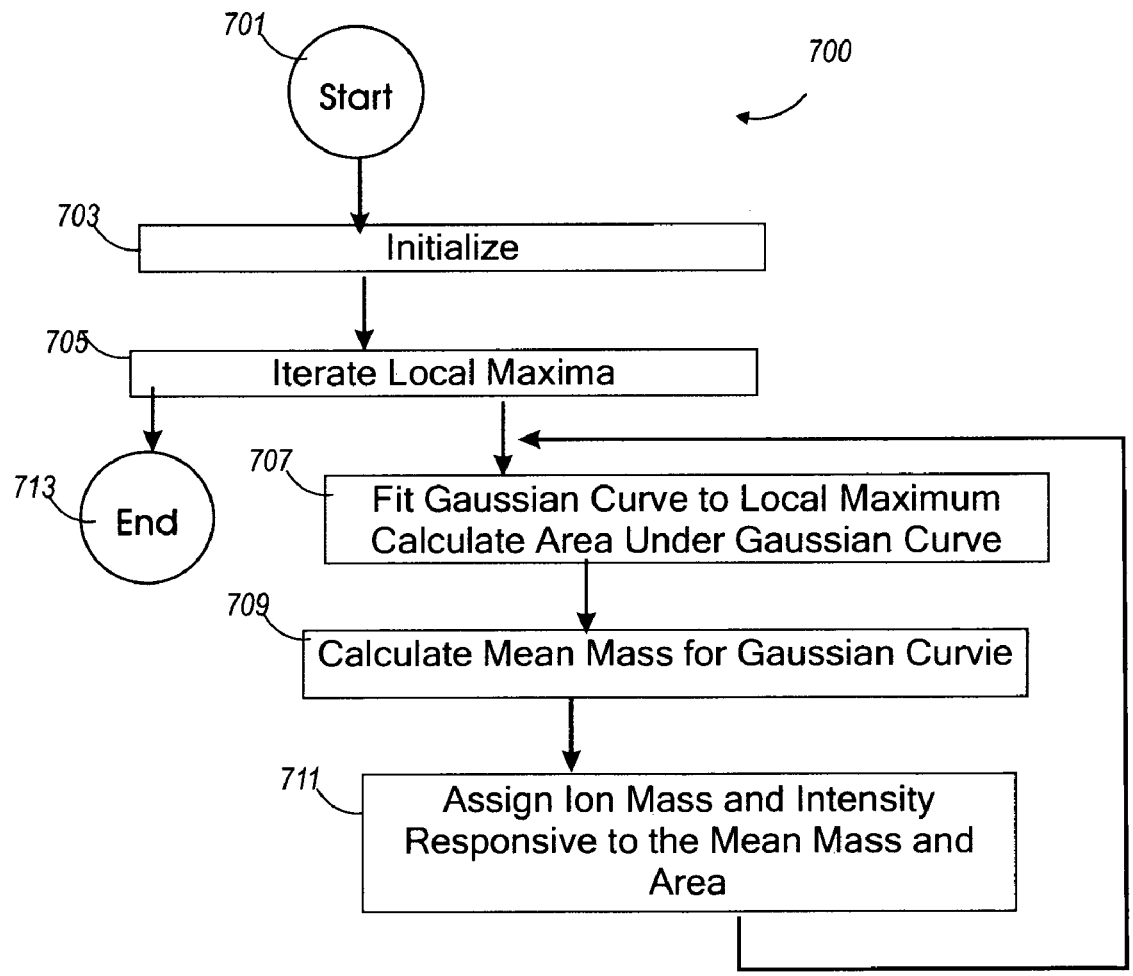
FIG. 7 illustrates a 'peak picking' process that can be used to obtain a set of n-tuples for spectral peaks.
Figure 8:
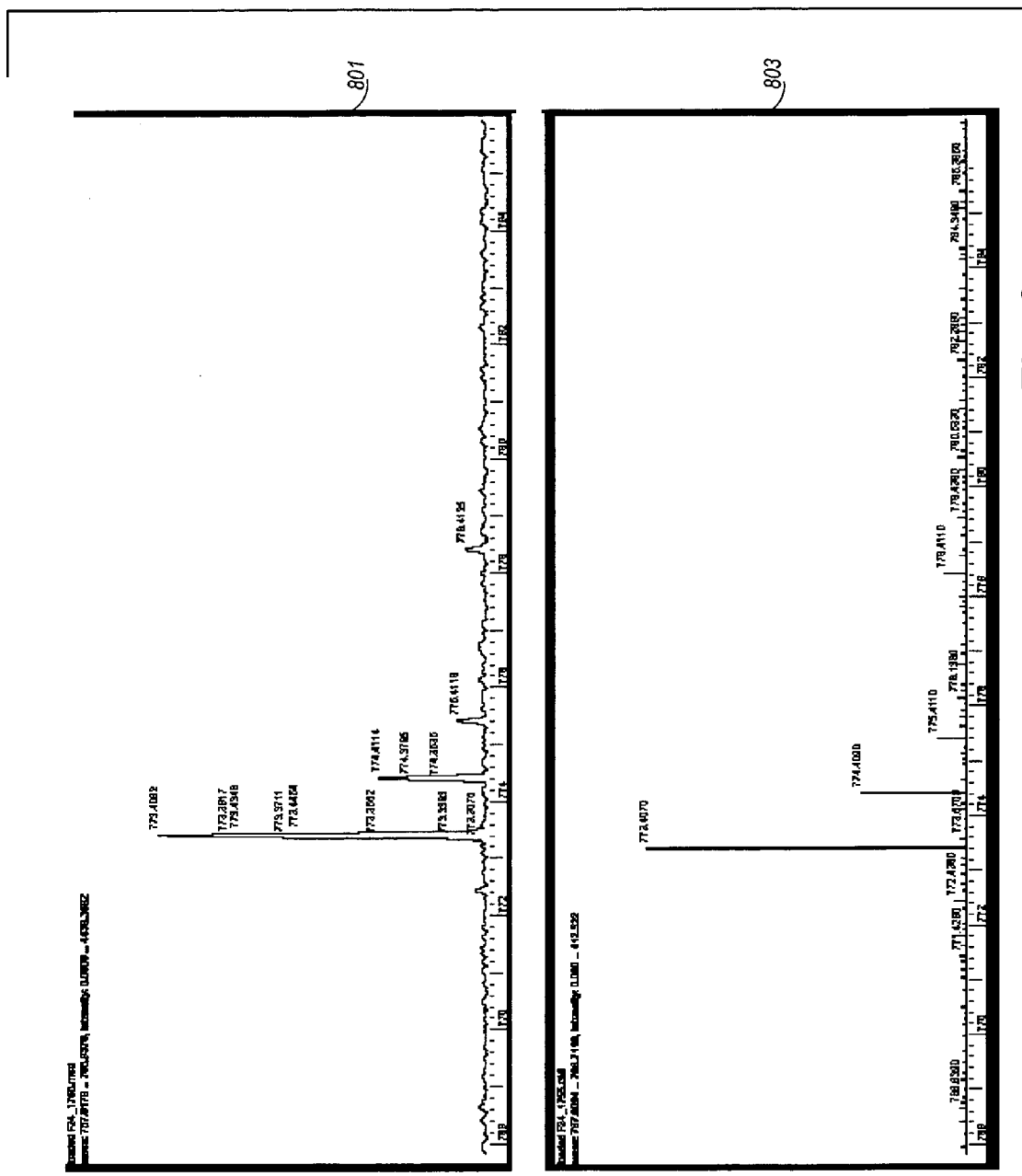
FIG. 8 compares raw spectral data within a spectrum with corresponding spectral data in a data set resulting from the method of FIG. 7.

A 'determine spectral peaks from spectral data' procedure 407 can assign m/z and peak intensity values for spectral peaks from the spectral data accepted by the 'accept spectral data' procedure 405 (as is subsequently discussed with respect to FIG. 7) to generate a spectral peak spectrum such as the impulse spectrum shown in FIG. 8 (the impulse spectrum can also be generated using techniques known to one skilled in the art). In some embodiments, data in one representation (which does not have the needed data characteristics) can be transformed into a data set that has the data characteristics needed for the disclosed technology.

Once the spectral peaks are determined, a 'process spectral peaks' procedure 409 generates a data value representation (a spectral peak profile) by processing each relevant spectral peak with respect to its peak intensity. Once the spectral peaks have been processed, a 'determine statistically significant portion of signal side' procedure 411 analyzes the data value representation to determine a statistically significant portion of the signal side of the data value representation. For the data set resulting from the Fourier-transform mass spectrometer fragmentation spectrum 200, the signal side is the high intensity side of the data value representation.

In one embodiment, the 'process spectral peaks' procedure 409 generates the data value representation as a histogram by binning the spectral peaks by their intensity. The statistically significant portion of the histogram is determined from well populated bins on the signal side of the histogram. The statistically significant portion of the data value representation is defined by selection parameters (for example, the number of spectral peaks in each bin, etc.). The selection parameters can be adjusted if the statistically significant portion does not generate a curve with appropriate characteristics (an example of which is subsequently discussed with respect to FIG. 5). In some embodiments the 'process spectral peaks' procedure 409 first identifies unambiguous spectral peaks and does not use them when constructing the data value representation. This improves the ratio of noise data values to valid data values, which improves the accuracy of the data value representation.

The statistically significant portion of the data value representation is then used by a 'curve fitting' procedure 413 to define a curve (as is subsequently shown with respect to FIG. 5). The curve extends beyond the statistically significant portion of the data value representation established by the 'process spectral peaks' procedure 409. The curve can be a line, a two dimensional curve, and/or a manifold in n-space or represented by any parameterized function.

After the curve is generated a 'valid fit' decision procedure 414 determines whether the curve is valid. In one embodiment, the 'valid fit' decision procedure 414 evaluates whether the parameters determined by the 'curve fitting' procedure 413 are within appropriate constraints. If so, the data-validity confidence value determination process 400 continues to a 'spectral peak' iterative procedure 415 that can iterate all or some selection of spectral peaks to obtain confidence values for the iterated spectral peaks. The confidence values can be, for example, a probability that the iterated spectral peak is a noise peak or a valid spectral peak; a component in a decision vector, or any technique known to one in the art to use the confidence values to distinguish a noise data value from a valid data value.

For each iterated spectral peak, a 'determine data-validity confidence value for spectral peak' procedure 417 compares the peak intensity of the iterated spectral peak to the curve and assigns a confidence value (a data-validity confidence value) for the iterated spectral peak.

After the spectral peaks are iterated, the data-validity confidence value determination process 400 completes through an 'end' terminal 419.

If at the 'valid fit' decision procedure 414 the fit of the curve is determined to be invalid, the data-validity confidence value determination process 400 continues to an 'adjust selection' procedure 421 that adjusts the values of the selection parameters and loops back to the 'curve fitting' procedure 413. One skilled in the art will understand how to detect and recover infinite loop conditions.

One skilled in the art will understand that once the curve is determined by the 'curve fitting' procedure 413 some embodiments can obtain a data-validity confidence value for any given spectral peak, or data-validity confidence values for selected spectral peaks, by independently invoking the 'determine data-validity confidence value for spectral peak' procedure 417. Such a one will also understand that there are many equivalent ways to implement the data-validity confidence value determination process 400.

Figure 5:
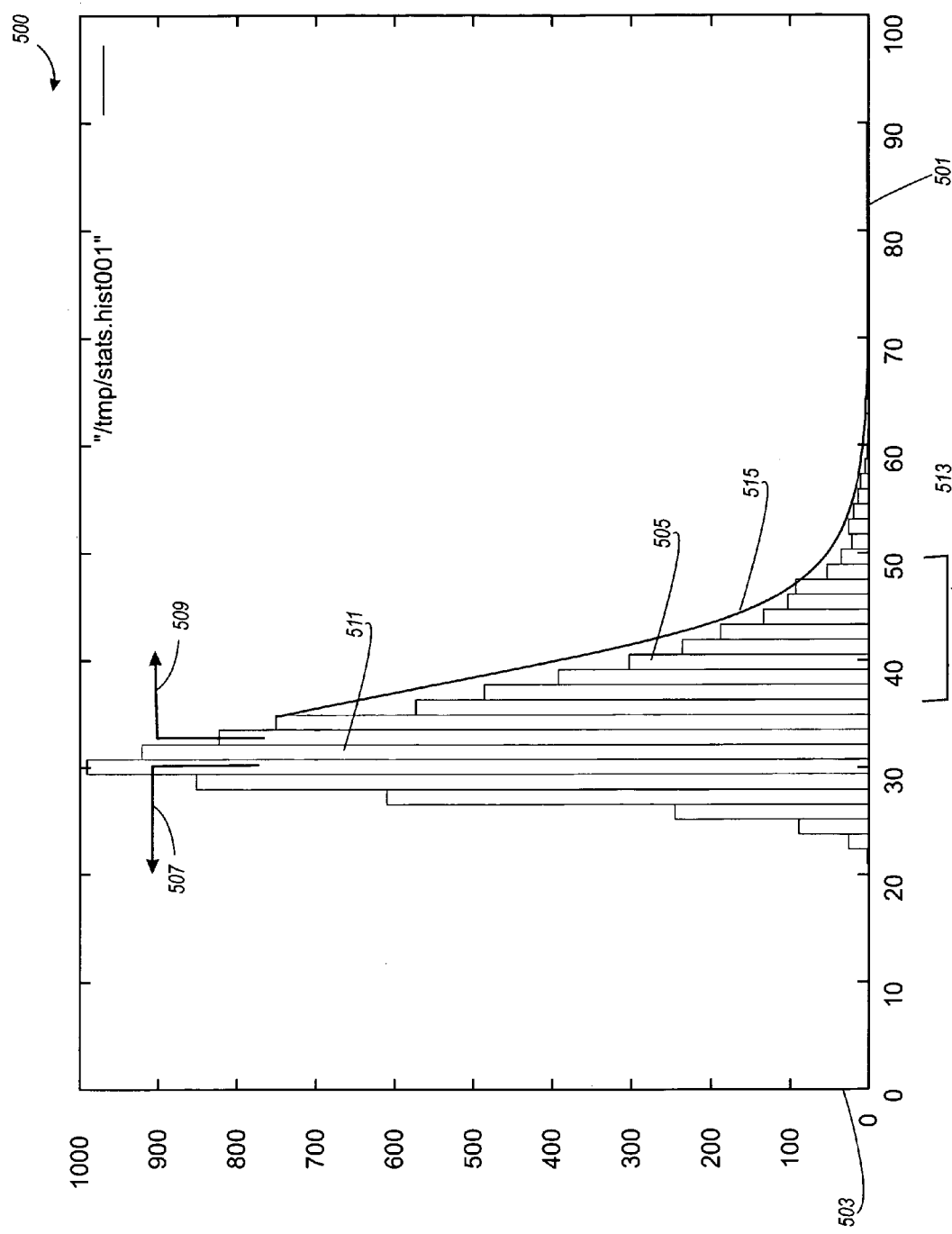
FIG. 5 illustrates a data value representation in the form of a histogram as is used in one embodiment.

FIG. 5 illustrates a histogram 500 as one example data value representation that can be produced by the 'process spectral peaks' procedure 409. The histogram 500 has a peak intensity axis 501, a count axis 503, and a set of bins (one of which is a bin 505). The leading side 507 of the histogram 500 includes bins populated by spectral peaks having a smaller peak intensity than a median data value representation 511 (in FIG. 5, the median data value representation 511 is at the labeled bin). The signal side 509 of the histogram 500 includes bins populated by spectral peaks having a larger peak intensity than the median data value representation 511.

The data value representation can be asymmetrical. Instead of guessing at a family of distributions that closely fits the entire histogram 500, the 'determine statistically significant portion of signal side' procedure 411 uses the selection parameters to determine a statistically significant portion 513 of the histogram 500. The statistically significant portion 513 includes bins that are sufficiently populated to be statistically meaningful as specified by the selection parameters. Once the statistically significant portion is determined, the 'curve fitting' procedure 413 fits a fitted curve 515 to the statistically significant portion 513 as is discussed with regard to FIG. 6.

In one embodiment, the selection parameters cause the bin width to be set as wide as possible while still maintaining the parameterized number of bins (for example, 15) in the statistically significant portion 513 and such that each bin in the statistically significant portion 513 is populated by a parameterized number of spectral peaks (for example, 5). The parameterized values can be included in, or can be derived from, the selection parameters.

A curve can be fitted to the signal side 509 of the data value representation. One example of the data value representation is a histogram (such as the histogram 500). The curve must extend past the statistically significant portion 513 and is used to distinguish noise data values from valid data values in the data set (spectrum). It is possible that bins populated by a small number of spectral peaks (for example, five or fewer) may leave a ragged tail at the signal side of the data value representation. Such a ragged tail can cause a curve-fitting algorithm to behave poorly and result in an inaccurate curve. For example, to check for such a situation with a quadratic curve, the quadratic fit parameters are verified by the condition $a_2>0$. If this condition is not satisfied, the selection parameters requirements are adjusted, and the curve refitted until the condition $a_2>0$ is satisfied (for example requiring that each bin in the statistically significant portion 513 be populated by at least seven spectral peaks). One skilled in the art can determine similar validation conditions for curves other than quadratic curves.

Figure 6:
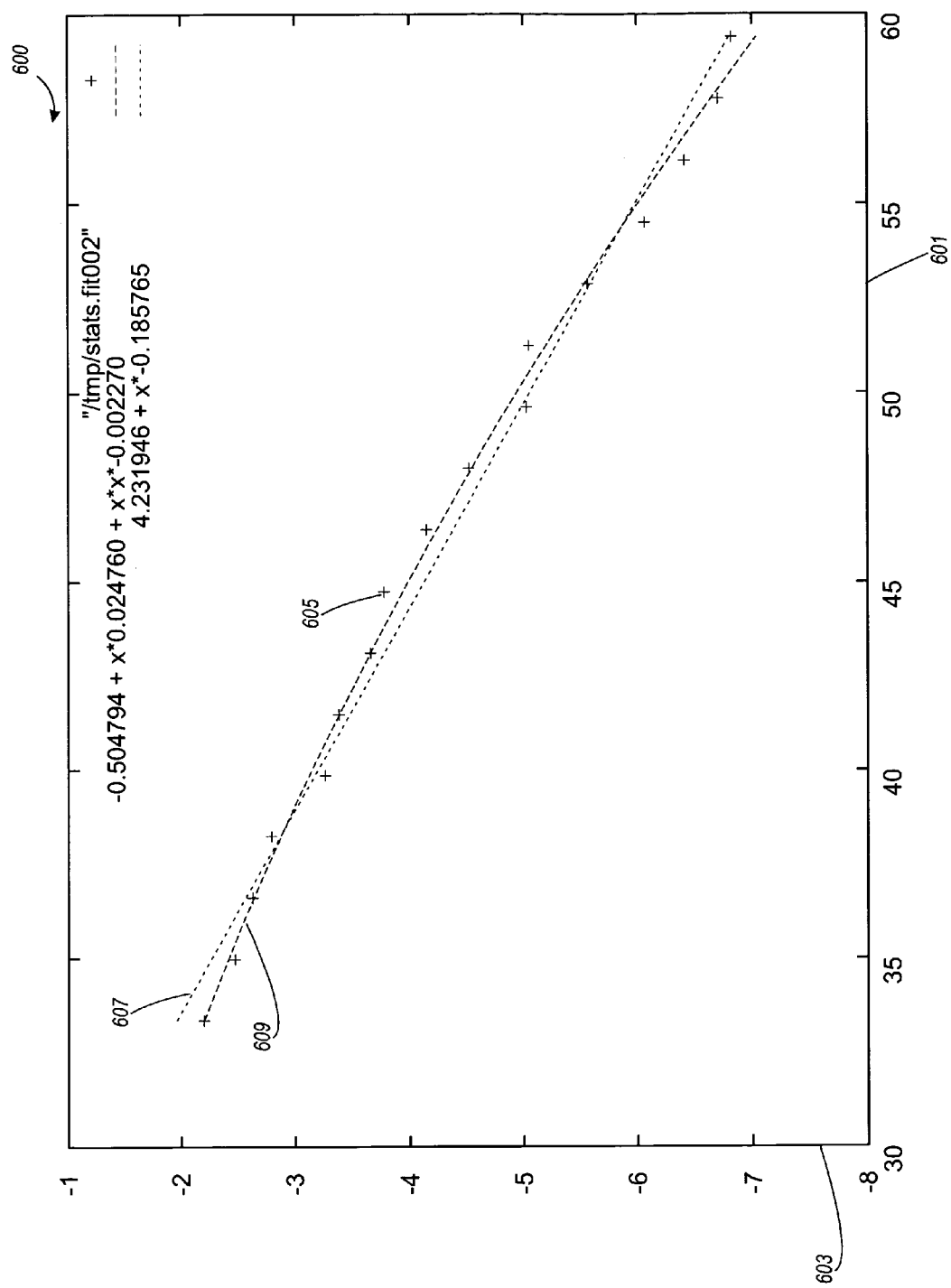
FIG. 6 is a graph showing a linear and quadratic curve fits to log intensities of a statistically significant portion of a histogram.

FIG. 6 illustrates a graph 600 having a peak intensity axis 601 and a logarithmic axis 603. The peak intensity axis 601 labels the peak intensity of the bins within the statistically significant portion 513. The logarithmic axis 603 labels the fraction of spectral peaks in the bin (that is, the logarithm of the number of spectral peaks in the bin divided by the total number of spectral peaks found by the 'determine spectral peaks from spectral data' procedure 407). A point 605 represents one of the bins from the statistically significant portion 513 of the histogram 500. Two fitted curves are plotted on the graph 600; a linear fit 607 and a quadratic fit 609. For this example, the decay of the data value representation (the signal side of the histogram 500) is similar to that of a normal function (that is, $\exp(-x^2)$). Thus, the quadratic fit 609 is a better fit to the points than the linear fit 607.

After fitting the log frequency to a quadratic $(-a_0-a_1x-a_2x^2)$, we know the signal side of the data value representation falls off like $\exp(-a_0-a_1x-a_2x^2)$. Thus, the probability of seeing a spectral peak of peak intensity greater than a can be computed from:

$$p = \int_\alpha^\infty e^{-(a_0+a_1x+a_2x^2)} = \frac{e^{-a_0+a_1^2/4a_2}}{\sqrt{a_2}} \text{erfc}\left[\left(\alpha + \frac{a_1}{2a_2}\right)\sqrt{a_2}\right]$$

where erfc is the complementary error function.

If there are N spectral peaks in the spectrum, then we would expect to see at least one noise peak of intensity greater than $\alpha$ with a probability of $1-(1-p)^N$, and so the data-validity confidence value of the peak is $(1-p)^N$.

One skilled in the art will understand that it is possible that:

$$\frac{e^{-a_0+a_1^2/4a_2}}{\sqrt{a_2}}$$

or $$\left(\alpha + \frac{a_1}{2a_2}\right)\sqrt{a_2}$$

could overflow and leave the expression for p indeterminate. However, when x is large, $$\text{erfc}(x) \approx \frac{\exp(-x^2)}{x\sqrt{\pi}}$$

so the expression for p becomes:

$$p \approx \frac{e^{-a_0-a_1-a2\alpha^2}}{\sqrt{\pi}\,\alpha(a_2+a_1/2)}.$$

Thus, the data-validity confidence value can be approximated when there is an overflow.

The characteristics of noise data value values can vary throughout the data set. In some embodiments, the data set can be divided into partitions. The partitions can overlap each other or can be separate from each other. For example, if the data set contains N data values, the data set can be separated into four partitions each containing more than N/4 data values (overlapping partitions), or N/4 data values (non-overlapping partitions). The data-validity confidence value determination process 400 can operate independently on each partition. In some embodiments, the 'determine data-validity confidence value for spectral peak' procedure 417 can, for each iterated spectral peak, select the partition for the iterated spectral peak by locating the partition having its median data value representation 511 closest to the iterated spectral peak.

FIG. 7 illustrates one embodiment of a peak picking process 700 that can transform the raw spectral data from a spectrum (such as that from a Fourier-transform mass spectrometer) into an impulse spectrum (the data set) with spectral data that represents the intensity and m/z of spectral peaks in the spectrum. The peak picking process 700 can be used or invoked by the 'determine spectral peaks from spectral data' procedure 407. The peak picking process 700 identifies spectral peaks and determines the corresponding peak intensity and m/z from the received raw spectral data. Once invoked, the peak picking process 700 initiates at a start terminal 701 and continues to an 'initialization' procedure 703 that initializes the process. A 'find local maxima' iteration procedure 705 locates and iterates each local maxima in the spectral data. As each local maxima is iterated, a 'calculate area under local maximum' procedure 707 fits a Gaussian curve to the local maxima and then calculates the area under the Gaussian curve; a 'calculate median m/z for Gaussian curve' procedure 709 determines the median m/z for the Gaussian curve; and an 'assign spectral peak intensity and m/z' procedure 711 then assigns the m/z and peak intensity to the spectral peak in the data set defining the impulse spectrum. Additional methods for picking spectral peaks from raw spectral data are known to those skilled in the art.

FIG. 8 illustrates a spectral data spectrum 801 and an impulse spectrum 803 showing the differences between the two spectra resulting from the application of the peak picking process 700 previously described.

One skilled in the art will understand that the techniques taught herein can be used to distinguish noise data values from valid data values in a data set. One of the many uses for this process is that of rejecting noise data values from spectra generated by Fourier-transform mass spectrometers. Such a one will also understand that these techniques can be applied to spectra resulting from any combination of macromolecules including disassociated molecules; protein, peptide, lipid, polymer (composed of a single monomer, or multiple monomers), and glycan molecules etc. The spectra can be obtained through either wide-window or normal window spectroscopy. Further, such a one will understand that the technology disclosed herein can be applied to any data set that contains a large number of noise data values and a relatively sparse number of valid data values.

One skilled in the art will understand that the disclosed technology improves the effective sensitivity of spectrometers by efficiently distinguishing valid data values from noise data values in spectral data that contains a noise band. Spectral data of this type is provided by Fourier-transform mass spectrometers. Such a one will also understand that the disclosed technology can be embodied within spectrometer devices, can be embodied within networked service devices, within networked computers, and/or within computing or electronic devices capable of performing the steps disclosed herein, and devices equivalent to those described herein.

From the foregoing, it will be appreciated that the technology has (without limitation) the following advantages:
1) In one embodiment, where the FTMS spectral data is of O-glycans, The vast majority spectral peaks of have either a data-validity confidence value of almost 1 or almost 0; thus, differentiating between valid data values and noise data values.
2) The disclosed technology generates a data-validity confidence value that enables automated differentiation of noise data values from valid data values in an appropriate data set.

Although the present technology has been described in terms of the presently preferred embodiments, one skilled in the art will understand that various modifications and alterations may be made without departing from the scope of the technology. Accordingly, the scope of the technology is not to be limited to the particular technology embodiments discussed herein.

What is claimed follows:

1. A computer controlled method comprising:
   processing a plurality of data values in a data set resulting in a data value representation, said data set containing a plurality of valid data values and a plurality of noise data values, said data value representation having a signal side, the number of said plurality of valid data values statistically insignificant with respect to the number of said plurality of noise data values;
   determining a statistically significant portion of said signal side; fitting a curve to said statistically significant portion, said curve extending beyond said statistically significant portion of said signal side;
   determining a data-validity confidence value for one of said plurality of data values responsive to said curve, said data-validity confidence value capable of being used to determine that said one of said plurality of data values is not one of said plurality of noise data values; and
   producing the data values which are not noise data values; wherein the data set is a set of spectral data from a spectrometer.

2. The computer controlled method of claim 1, wherein each of said plurality of valid data values and said plurality of noise data values are represented as an n-tuple.

3. The computer controlled method of claim 2, wherein said n-tuple includes a peak intensity value and a m/z value.

4. The computer controlled method of claim 1, wherein said data set comprises a noise band that contains a large percentage of said plurality of noise data values and, at most, a small percentage of said plurality of valid data values.

5. The computer controlled method of claim 1, wherein said data value representation is a histogram.

6. The computer controlled method of claim 1, wherein said plurality of valid data values includes an obvious signal value, and processing said plurality of data values further comprising ignoring said obvious signal value.

7. The computer controlled method of claim 1, wherein said data set is a transformation of a second dataset.

8. The computer controlled method of claim 1, wherein said data set is from a mass spectrometer, said plurality of valid data values is a plurality of signal peaks, and said plurality of noise data values is a plurality of noise peaks.

9. The computer controlled method of claim 1, wherein said data set is one of a plurality of partitions of a second dataset, said second dataset containing a super set of said plurality of data values, the method further comprising:
   determining a median value for said data set; and
   selecting said data set responsive to said median value and one of said super set.

10. The computer controlled method of claim 9, wherein said data set overlaps a second of said plurality of partitions of said second dataset.

11. An apparatus having a central processing unit (CPU) and a memory coupled to said CPU comprising:
   an input logic configured to access a data set containing a plurality of valid data values and a plurality of noise data values, the number of said plurality of valid data values statistically insignificant with respect to the number of said plurality of noise data values;
   a processing logic configured to process a plurality of data values in said data set resulting in a data value representation stored in said memory, said data value representation having a signal side;
   a first determination logic, responsive to the processing logic, configured to determine a statistically significant portion of said signal side;
   a curve fitting logic, responsive to the first determination logic, configured to fit a curve to said statistically significant portion, said curve extending beyond said statistically significant portion of said signal side; and
   a second determination logic configured to determine a data-validity confidence value for one of said plurality of data values responsive to said curve, said data-validity confidence value capable of being used to determine that said one of said plurality of data values is not one of said plurality of noise data values.

12. The apparatus of claim 11, wherein each of said plurality of valid data values and said plurality of noise data values are represented as an n-tuple.

13. The apparatus of claim 12, wherein said n-tuple includes a peak intensity value and a m/z value.

14. The apparatus of claim 11, wherein said data set comprises a noise band that contains a large percentage of said plurality of noise data values and, at most, a small percentage of said plurality of valid data values.

15. The apparatus of claim 11, wherein said data value representation is a histogram.

16. The apparatus of claim 11, wherein said plurality of valid data values includes an obvious signal value, the processing logic further comprising a filter logic configured to ignore said obvious signal value.

17. The apparatus of claim 11, wherein said data set is a transformation of a second dataset.

18. The apparatus of claim 11, wherein said data set is one of a plurality of partitions of a second dataset, said second dataset containing a super set of said plurality of data values, the processing logic further comprising a third determination logic configured to determine a median value for said data set, and the second determination logic further comprising a selection logic configured to select said data set responsive to said median value and one of said super set.

19. The apparatus of claim 18, wherein said data set overlaps a second of said plurality of partitions of said second dataset.

20. The apparatus of claim 11, wherein said data set is from a mass spectrometer, said plurality of valid data values is a plurality of signal peaks, and said plurality of noise data values is a plurality of noise peaks.

21. A computer program product comprising:

a computer-usable storage medium containing instructions that, when executed by a computer, cause said computer to perform a method comprising:

processing a plurality of data values in a data set resulting in a data value representation, said data set containing a plurality of valid data values and a plurality of noise data values, said data value representation having a signal side, the number of said plurality of valid data values statistically insignificant with respect to the number of said plurality of noise data values;

determining a statistically significant portion of said signal side;

fitting a curve to said statistically significant portion, said curve extending beyond said statistically significant portion of said signal side;

determining a data-validity confidence value for one of said plurality of data values responsive to said curve, said data-validity confidence value capable of being used to determine that said one of said plurality of data values is not one of said plurality of noise data values; and producing the data values which are not noise data values;

wherein the data set is a set of spectral data from a spectrometer.

22. The computer program product of claim 21, wherein each of said plurality of valid data values and said plurality of noise data values are represented as an n-tuple.

23. The computer program product of claim 22, wherein said n-tuple includes a peak intensity value and a m/z value.

24. The computer program product of claim 21, wherein said data set comprises a noise band that contains a large percentage of said plurality of noise data values and, at most, a small percentage of said plurality of valid data values.

25. The computer program product of claim 21, wherein said data value representation is a histogram.

26. The computer program product of claim 21, wherein said plurality of valid data values includes an obvious signal value and processing said plurality of data values further comprising ignoring said obvious signal value.

27. The computer program product of claim 21, wherein said data set is a transformation of a second dataset.

28. The computer program product of claim 21, wherein said data set is one of a plurality of partitions of a second dataset, said second dataset containing a super set of said plurality of data values, the product further comprising:

determining a median value for said data set; and selecting said data set responsive to said median value and one of said super set.

29. The computer program product of claim 28, wherein said data set overlaps a second of said plurality of partitions of said second dataset.

30. The computer program product of claim 1, wherein said data set is from a mass spectrometer, said plurality of valid data values is a plurality of signal peaks, and said plurality of noise data values is a plurality of noise peaks.

* * * * *